United States Patent
Byers et al.

(10) Patent No.: US 11,104,552 B2
(45) Date of Patent: Aug. 31, 2021

(54) DOCKING AND UNDOCKING PAYLOADS FROM MOBILE ROBOTS

(71) Applicant: Cisco Technology, Inc., San Jose, CA (US)

(72) Inventors: Charles Calvin Byers, Wheaton, IL (US); Robert Gregory Twiss, Chapel Hill, NC (US)

(73) Assignee: Cisco Technology, Inc., San Jose, CA (US)

( * ) Notice: Subject to any disclaimer, the term of this patent is extended or adjusted under 35 U.S.C. 154(b) by 90 days.

(21) Appl. No.: 16/142,604

(22) Filed: Sep. 26, 2018

(65) Prior Publication Data
US 2020/0095074 A1   Mar. 26, 2020

(51) Int. Cl.
*B66C 1/06* (2006.01)
*B64C 39/02* (2006.01)
(Continued)

(52) U.S. Cl.
CPC .............. *B66C 1/06* (2013.01); *B64C 39/024* (2013.01); *B64C 2201/128* (2013.01);
(Continued)

(58) Field of Classification Search
CPC ... B64C 2201/128; B66C 1/06; B25J 15/0608
See application file for complete search history.

(56) References Cited

U.S. PATENT DOCUMENTS 4,075,589 A * 2/1978 Braillon ............... B23Q 3/1546
                                                                335/286
4,965,695 A * 10/1990 Baumann .................. H01F 7/04
                                                                294/65.5
(Continued)

FOREIGN PATENT DOCUMENTS

EP           2796400 A1 * 10/2014 .............. B66F 9/182

OTHER PUBLICATIONS

"ATI Industrial Automation: Automatic / Robotic Tool Changers", online: https://www.ati-ia.com/products/toolchanger/robot_tool_changer.aspx, printed Mar. 31, 2020, 2 pages.
(Continued)

*Primary Examiner* — James Keenan
(74) *Attorney, Agent, or Firm* — Behmke Innovation Group LLC; James M. Behmke; Jonathon P. Western

(57) ABSTRACT

In one embodiment, a mobile robot energizes its state-variable anchor into a released state while contacting a payload, and then de-energizes it to put it into an anchored state, attaching it to the payload. The mobile robot may then move the payload to a mounting location while the state-variable anchor is de-energized and attached to the payload. As such, the mobile robot may then energize a state-variable anchor of the payload to put it into a released state while at and contacting the mounting location, and then de-energizes it to put it into an anchored state to attach the payload to the mounting location. To then detach the state-variable anchor of the mobile robot and the mobile robot from the payload after the payload is attached to the mounting location, the mobile robot may then energize the state-variable anchor of the mobile robot to put it into a released state.

6 Claims, 13 Drawing Sheets

(51) Int. Cl.
*B65G 67/00* (2006.01)
*B66C 1/00* (2006.01)
*B66C 1/62* (2006.01)
*B66C 1/02* (2006.01)

(52) U.S. Cl.
CPC ...... *B65G 67/00* (2013.01); *B65G 2814/0398* (2013.01); *B66C 1/00* (2013.01); *B66C 1/02* (2013.01); *B66C 1/62* (2013.01)

(56) References Cited

U.S. PATENT DOCUMENTS

| | | | | |
|---|---|---|---|---|
| 7,793,900 B2* | 9/2010 | Feng | ..................... | B25J 15/0608 |
| | | | | 248/206.5 |
| 9,932,110 B2* | 4/2018 | McNally | ............... | B64C 39/024 |
| 10,065,726 B1* | 9/2018 | Phan | ....................... | B64C 1/063 |
| 10,144,618 B2* | 12/2018 | Molteni | .................... | B66C 1/04 |
| 10,518,881 B2* | 12/2019 | Liu | ....................... | B64C 39/024 |
| 10,625,383 B2* | 4/2020 | Butikofer | ............. | B23Q 3/1543 |
| 10,850,370 B2* | 12/2020 | Tanaka | ................. | B25J 15/0616 |
| 2015/0291397 A1* | 10/2015 | Molteni | ..................... | B66C 1/06 |
| | | | | 294/65.5 |
| 2019/0291867 A1* | 9/2019 | Fiaz | ...................... | B64C 39/024 |
| 2019/0323866 A1* | 10/2019 | Heafitz | .................. | G01D 21/00 |
| 2020/0031473 A1* | 1/2020 | Martens | ................ | B64C 39/02 |
| 2020/0185137 A1* | 6/2020 | Morton | ..................... | H01F 7/17 |

OTHER PUBLICATIONS

"Magnetic Phone Holders—Walmart.com" online: https://www.walmart.com/c/kp/magnetic-phone-holders, printed Mar. 31, 2020, 4 pages.

* cited by examiner

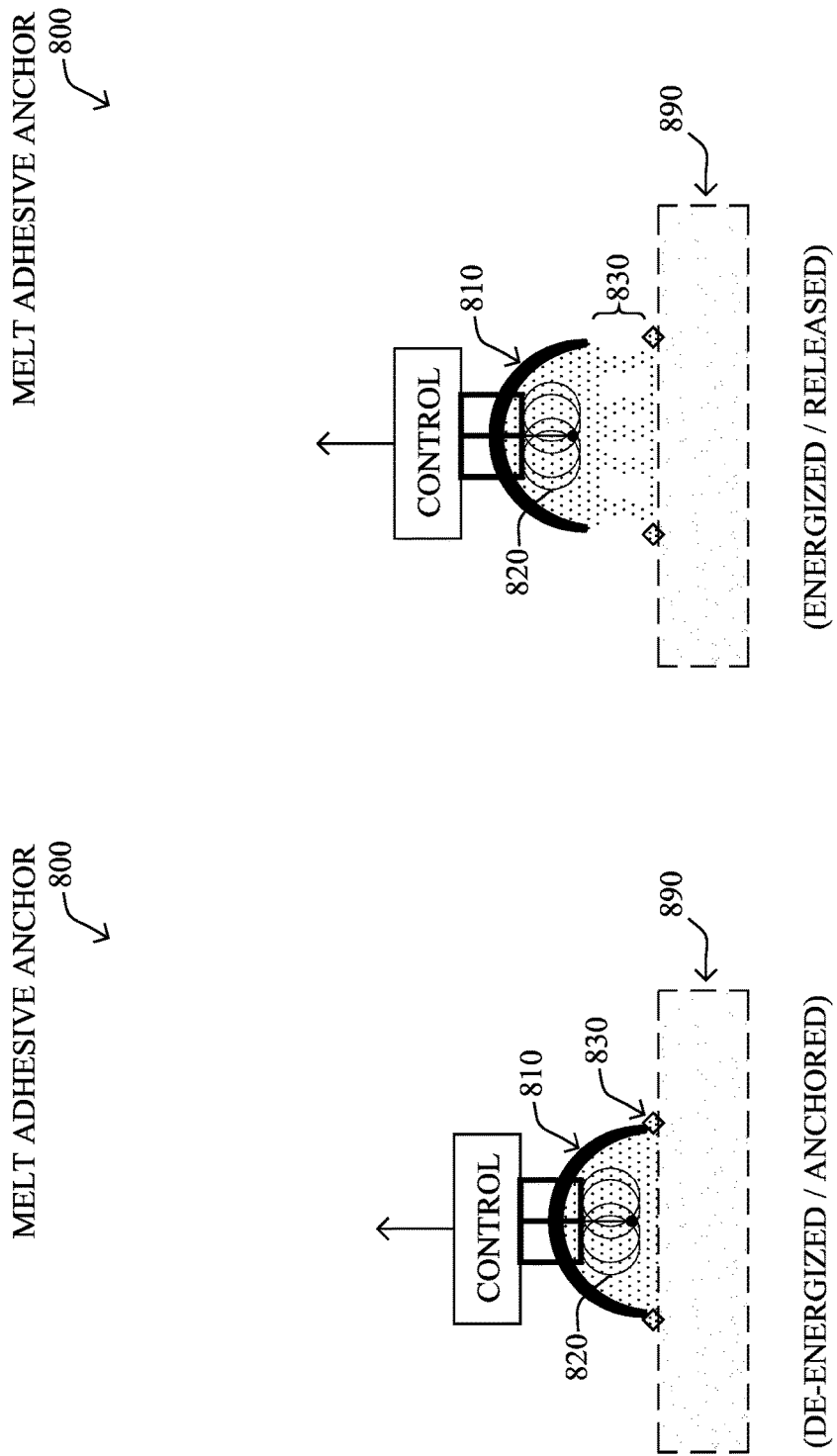

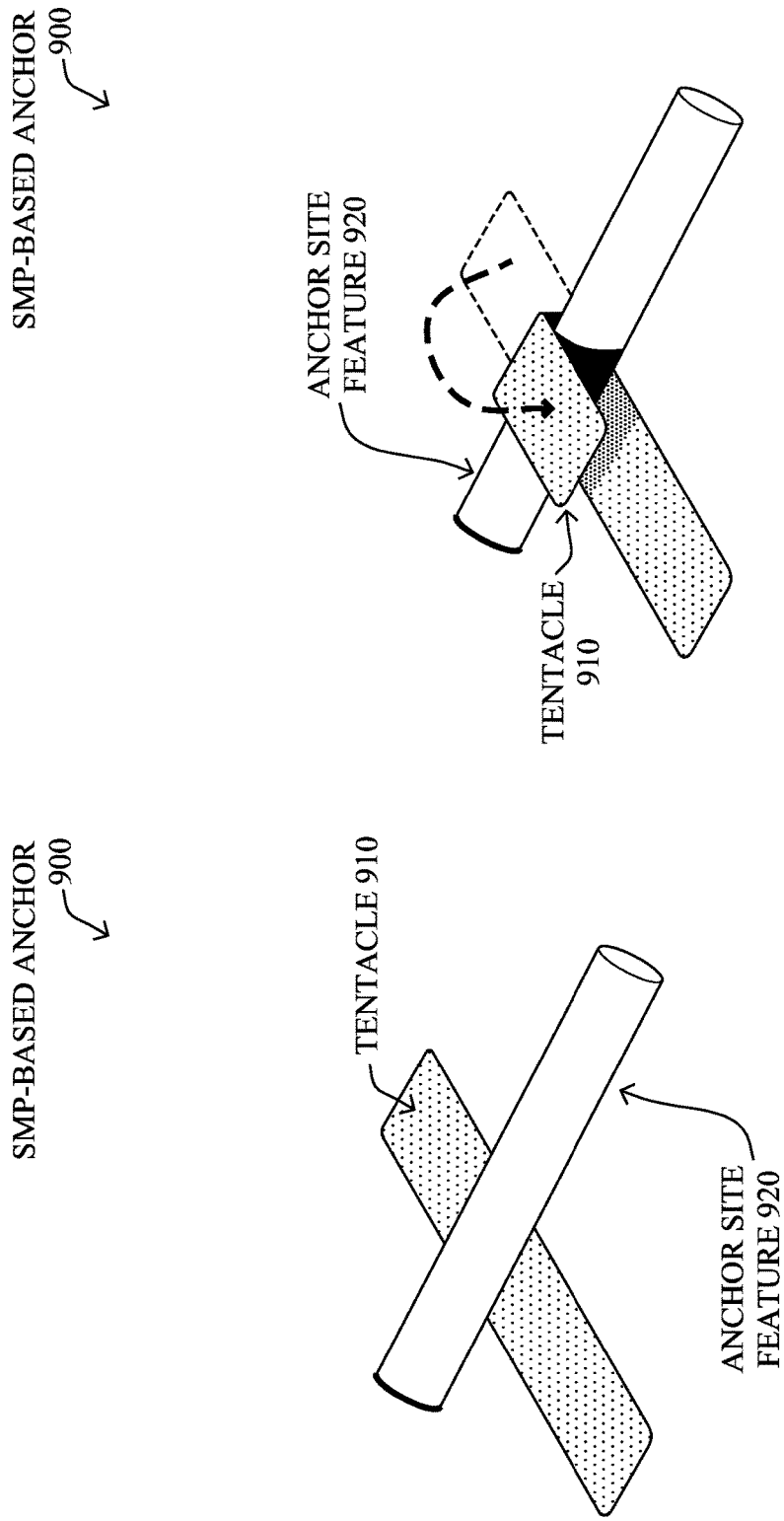

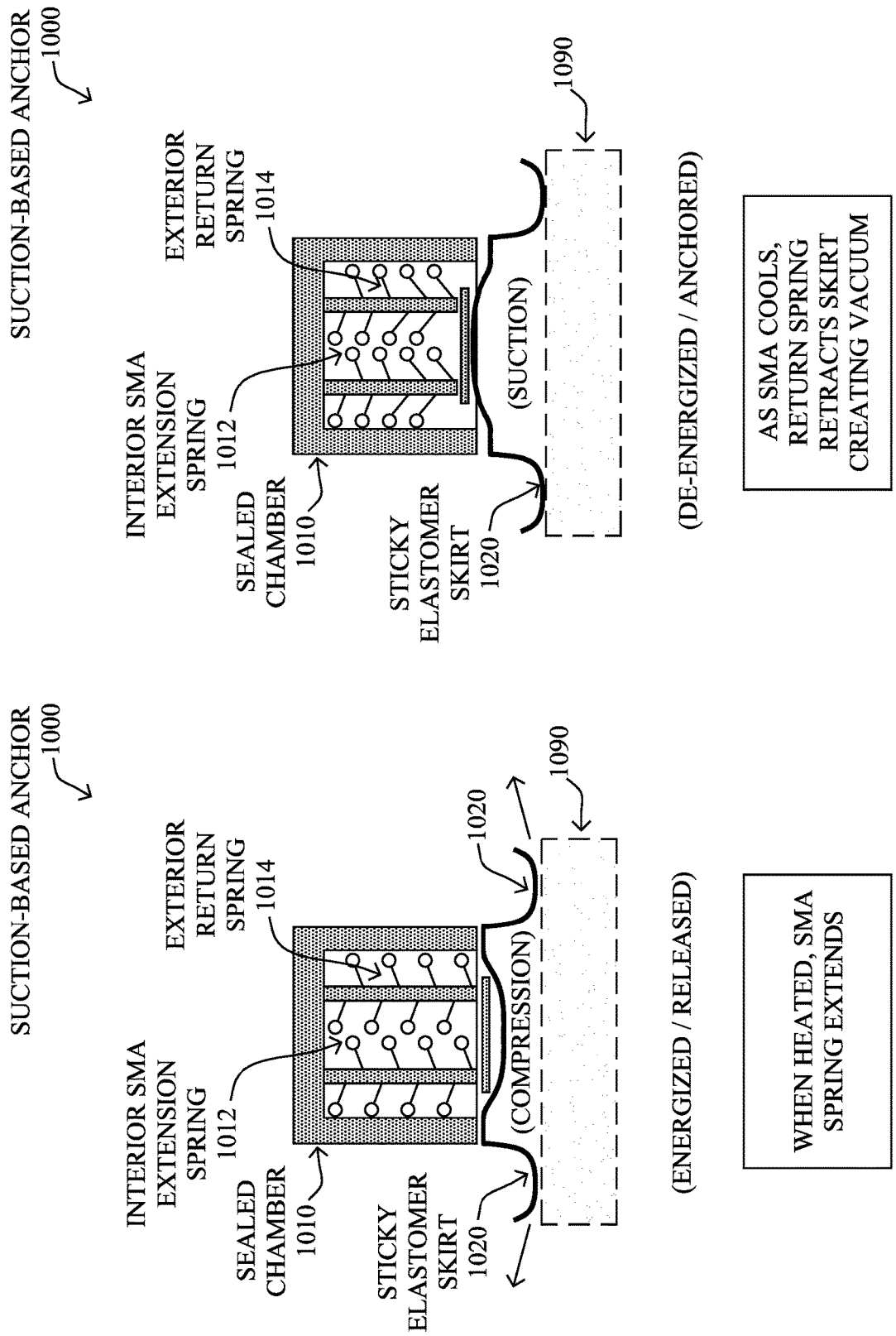

DOCKING AND UNDOCKING PAYLOADS FROM MOBILE ROBOTS

TECHNICAL FIELD

The present disclosure relates generally to mobile robots, and, more particularly, to docking and undocking payloads from mobile robots.

BACKGROUND

Mobile robots like unmanned aerial vehicles (UAVs), autonomous ground robots, and autonomous watercraft will play increasing roles in placing and retrieving large numbers of sensors, actuators, fog nodes, and other devices, particularly as the Internet of Things (IoT) becomes increasingly more prevalent. These devices often will be placed in remote, inaccessible, or dangerous locations, and must be securely anchored to their placed position to ensure that wind, vibrations, or vandals won't move them, and so that they won't fall off, possibly damaging the devices or harming bystanders or property. The placement and retrieval of IoT devices must be quick, safe, and inexpensive.

BRIEF DESCRIPTION OF THE DRAWINGS

The embodiments herein may be better understood by referring to the following description in conjunction with the accompanying drawings in which like reference numerals indicate identically or functionally similar elements, of which:

FIGS. 8A-8B illustrate an example of a state-variable anchor as a melting-adhesive-based anchor;

FIGS. 9A-9B illustrate an example of a state-variable anchor as a shape memory polymer (SMP)-based anchor;

FIGS. 10A-10B illustrate an example of a state-variable anchor as a suction-based anchor;

DESCRIPTION OF EXAMPLE EMBODIMENTS

Overview

Figure 1:
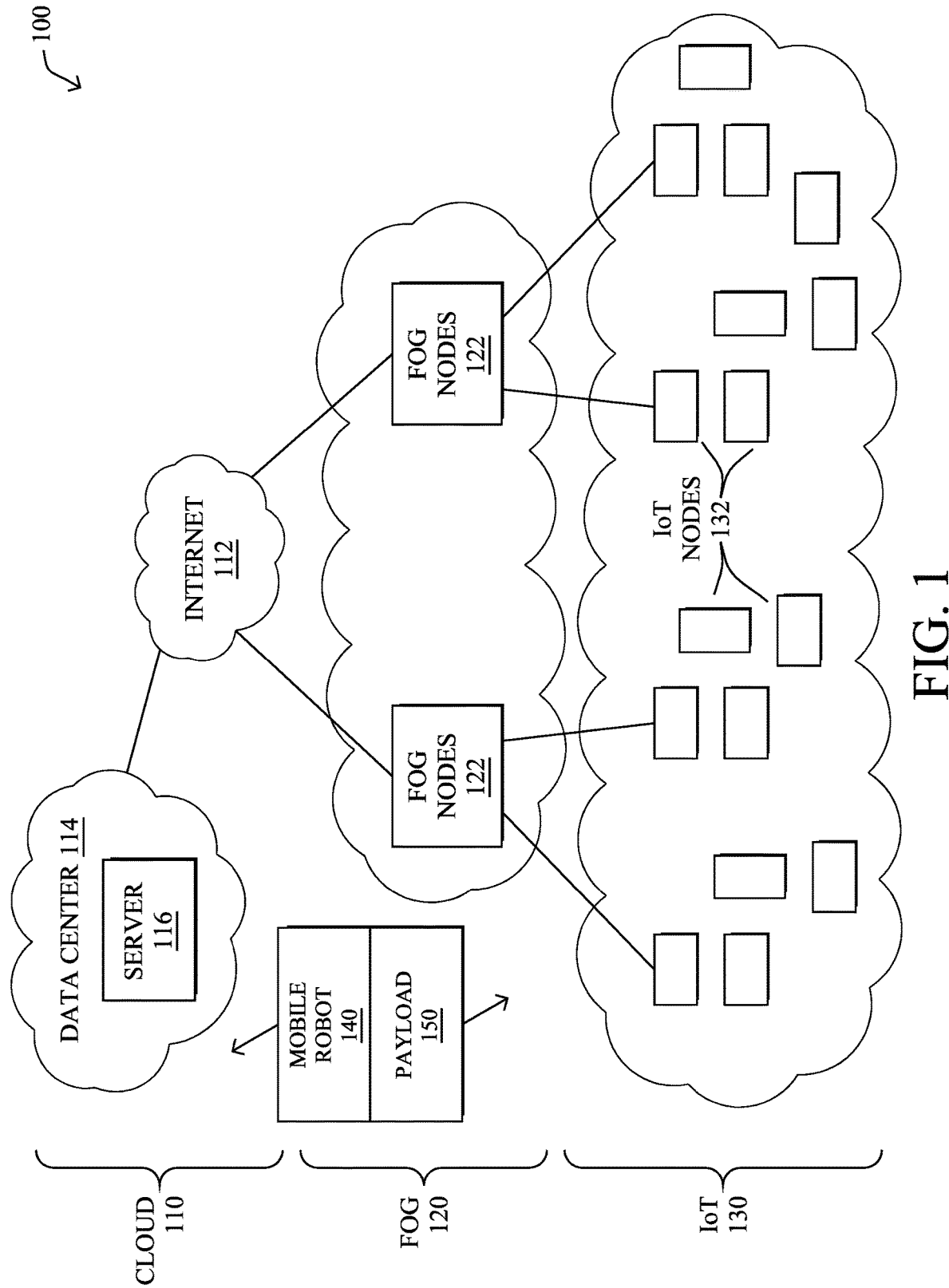
FIG. 1 illustrates an example computer network.

According to one or more embodiments of the disclosure, a mobile robot energizes a state-variable anchor of the mobile robot to put the state-variable anchor of the mobile robot into a released state, contacts the state-variable anchor of the mobile robot to a payload while the state-variable anchor of the mobile robot is energized and in the released state, and de-energizes the state-variable anchor of the mobile robot while contacting the payload to put the state-variable anchor of the mobile robot into an anchored state to attach the payload to the state-variable anchor of the mobile robot. The mobile robot may then move the payload to a mounting location while the state-variable anchor of the mobile robot is de-energized in the anchored state and attached to the payload. As such, the mobile robot may then energize a state-variable anchor of the payload to put the state-variable anchor of the payload into a released state while at the mounting location, contact the state-variable anchor of the payload to the mounting location while the state-variable anchor of the payload is energized and in the released state, and de-energize the state-variable anchor of the payload while contacting the state-variable anchor of the payload to the mounting location to put the state-variable anchor of the payload into an anchored state to attach the payload to the mounting location. To then detach the state-variable anchor of the mobile robot and the mobile robot from the payload after the payload is attached to the mounting location, the mobile robot may then energize the state-variable anchor of the mobile robot to put the state-variable anchor of the mobile robot into a released state.

According to one or more additional embodiments of the disclosure, an apparatus (e.g., a mobile robot) may comprise: i) a mobility mechanism configured to move the apparatus, ii) a state-variable anchor configured to interface with a payload, the state-variable anchor further configured to remain in an anchored state while de-energized and to change to a released state while energized, iii) a first energy source configured to energize and de-energize the state-variable anchor of the robot, and iv) a second energy source configured to interface with a state-variable anchor of the payload and to energize the state-variable anchor of the payload to put the state-variable anchor of the payload into a released state, the second energy source further configured to de-energize the state-variable anchor of the payload to put the state-variable anchor of the payload into an anchored state. As mentioned above, energizing the state-variable anchor while contacting the payload and then de-energizing the state-variable anchor of the robot while contacting the payload attaches the payload to the state-variable anchor, energizing the state-variable anchor of the payload while contacting a mounting location and then de-energizing the state-variable anchor of the payload while contacting the mounting location attaches the payload to the mounting location, and energizing the state-variable anchor of the robot after the payload is attached to the mounting location detaches the state-variable anchor and the apparatus from the payload.

According to one or more additional embodiments of the disclosure, another apparatus (e.g., a payload) may comprise: i) a mounting surface configured to interface with a state-variable anchor of a mobile robot, the state-variable anchor of the mobile robot configured to attach to the mounting surface by energizing into a released state while contacting the mounting surface then de-energizing while still contacting the mounting surface to change to an anchored state with the mounting surface, the state-variable anchor of the mobile robot remaining in the anchored state with the mounting surface of the apparatus while de-energized, ii) a state-variable anchor configured to energize into a released state and to de-energize into an anchored state, and iii) an energy conduit configured to pass energy from the mobile robot to the state-variable anchor. To attach the apparatus to the mounting location, the state-variable anchor may be energized into the released state via the energy conduit while the state-variable anchor is contacting a mounting location and then de-energized into the anchored state while contacting the mounting location. Furthermore, the state-variable anchor of the mobile robot is further configured to be energized into the released state after the state-variable anchor of the apparatus is attached to the mounting location to detach the state-variable anchor of the mobile robot and the mobile robot from the apparatus.

These and other embodiments, such as retrieving the payload from the mounting location and others, may be achieved according to the description below, and those embodiments mentioned above are examples not meant to be limiting to the scope of the present disclosure.

DESCRIPTION

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links. Other types of networks, such as field area networks (FANs), neighborhood area networks (NANs), personal area networks (PANs), etc. may also make up the components of any given computer network.

In various embodiments, computer networks may include an Internet of Things network. Loosely, the term "Internet of Things" or "IoT" (or "Internet of Everything" or "IoE") refers to uniquely identifiable objects (things) and their virtual representations in a network-based architecture. In particular, the next frontier in the evolution of the Internet is the ability to connect more than just computers and communications devices, but rather the ability to connect "objects" in general, such as lights, appliances, vehicles, heating, ventilating, and air-conditioning (HVAC), windows and window shades and blinds, doors, locks, displays, etc. The "Internet of Things" thus generally refers to the interconnection of objects (e.g., smart objects), such as sensors and actuators, over a computer network (e.g., via IP or other protocols), which may be the public Internet or a private network.

Often, IoT networks operate within a shared-media mesh networks, such as wireless or Power-Line Communication (PLC) networks, etc., and are often on what is referred to as Low-Power and Lossy Networks (LLNs), which are a class of network in which both the routers and their interconnect are constrained. That is, LLN devices/routers typically operate with constraints, e.g., processing power, memory, and/or energy (battery), and their interconnects are characterized by, illustratively, high loss rates, low data rates, and/or instability. IoT networks are comprised of anything from a few dozen to thousands or even millions of devices, and support point-to-point traffic (between devices inside the network), point-to-multipoint traffic (from a central control point such as a root node to a subset of devices inside the network), and multipoint-to-point traffic (from devices inside the network towards a central control point).

Fog computing is a distributed approach of cloud implementation that acts as an intermediate layer or layers from local networks of things (e.g., IoT networks) to the cloud (e.g., centralized and/or shared resources, as will be understood by those skilled in the art). That is, generally, fog computing entails using devices at the network edge to provide application services to the local nodes in the network, in contrast to cloud-based approaches that rely on remote data centers/cloud environments for the services. To this end, a fog node is a functional node that is deployed close to fog endpoints to provide computing, storage, and networking resources and services. Multiple fog nodes organized or configured together form a fog system, to implement a particular solution. Fog nodes and fog systems can have the same or complementary capabilities, in various implementations. That is, each individual fog node does not have to implement the entire spectrum of capabilities. Instead, the fog capabilities may be distributed across multiple fog nodes and systems, which may collaborate to help each other to provide the desired services. In other words, a fog system can include any number of virtualized services and/or data stores that are spread across the distributed fog nodes. This may include a master-slave configuration, publish-subscribe configuration, or peer-to-peer configuration.

FIG. 1 is a schematic block diagram of an example simplified computer network 100 illustratively comprising nodes/devices at various levels of the network, interconnected by various methods of communication. For instance, the links may be wired links or shared media (e.g., wireless links, PLC links, etc.) where certain nodes, such as, e.g., routers, sensors, computers, etc., may be in communication with other devices, e.g., based on connectivity, distance, signal strength, current operational status, location, etc.

Specifically, as shown in the example network 100, three illustrative layers are shown, namely the cloud 110, fog 120, and IoT 130 (note that "fog" may be considered part of the IoT network 130, such that portion 130 refers more specifically to the "things" or "intelligent things"). Illustratively, the cloud 110 may comprise general connectivity via the Internet 112, and may contain one or more datacenters 114 with one or more centralized servers 116 or other devices, as will be appreciated by those skilled in the art.

Within the fog layer 120, various fog devices/nodes 122 (e.g., with fog modules, described below) may execute various fog computing resources on network edge devices, as opposed to datacenter/cloud-based servers or on the endpoint nodes 132 themselves of the IoT layer 130. Data packets (e.g., traffic and/or messages sent between the devices/nodes) may be exchanged among the nodes/devices of the computer network 100 using predefined network communication protocols such as certain known wired protocols, wireless protocols, PLC protocols, or other shared-media protocols where appropriate. In this context, a protocol consists of a set of rules defining how the nodes interact with each other.

Those skilled in the art will understand that any number of nodes, devices, links, etc. may be used in a computer network, and that the view shown herein is for simplicity. Also, those skilled in the art will further understand that while the network is shown in a certain orientation, the network 100 is merely an example illustration that is not meant to limit the disclosure.

In addition, and as described further below, one or more mobile robots 140 (e.g., autonomous carriers) may be configured to carry one or more modules 150 for installation and activation within the network 100.

In particular, as noted above, mobile robots like unmanned aerial vehicles (UAVs), autonomous ground robots, autonomous watercraft, and so on, may be used to place and retrieve large numbers of sensors, actuators, fog nodes, and other devices, particularly as the IoT becomes increasingly more prevalent. These devices, or other payloads not limited to computer networking payloads, often will be placed in remote, inaccessible, or dangerous locations, and must be securely anchored to their placed position to ensure that wind, vibrations, or vandals won't move them, and so that they won't fall off, possibly damaging the devices or harming bystanders or property.

Moreover, autonomous vehicles must be able to install payloads into their anchor position using only the limited force they can safely exert (for example, in the case of consumer class drones, a few pounds of force). However, they must also be easy to reliably un-anchor with little force on command in the likely event the autonomous vehicle needs to retrieve the payload, such as for charging, maintenance, inspection, cleaning, calibration, repair, upgrade, or replacement. Furthermore, as most remote IoT devices will be working with very constrained energy budgets, any associated anchorage system can't draw any ongoing static power from the device's batteries.

Docking and Undocking Payloads from Mobile Robots

The techniques herein relate to the design and use of a state-variable anchor system that allows a payload to be securely attached to a mobile robot, and then released to after the mobile robot securely engages the payload to a mounting location, specifically with the ability to stay engaged indefinitely without the continuous use of power. Then, when it is time to retrieve the payload, the anchor system can disengage from the mounting location with little force upon command from the mobile robot. For example, the techniques herein may provide a docking/undocking system that allows mobile robots (e.g., drones) to easily place and retrieve remotely located IoT devices, such as sensor platforms, access points, and so on. Several embodiments of state-variable anchors are described herein that attach/anchor and detach/release upon command, particularly where deactivation of the anchor creates an anchored state (so no power is used while anchored), and activation of the anchor releases the anchor (so power is only used during the action of attaching or detaching the payload).

Specifically, according to one or more embodiments of the disclosure as described in detail below, a mobile robot energizes its state-variable anchor into a released state while contacting a payload, and then de-energizes it to put it into an anchored state, attaching it to the payload. The mobile robot may then move the payload to a mounting location while the robot's state-variable anchor is de-energized and attached to the payload. As such, the mobile robot may then energize a state-variable anchor of the payload to put it into a released state while at and contacting the mounting location, and then de-energizes it to put it into an anchored state to attach the payload to the mounting location. To then detach the state-variable anchor of the mobile robot and the mobile robot from the payload after the payload is attached to the mounting location, the mobile robot may then energize the state-variable anchor of the mobile robot to put it into a released state. Other specific embodiments are also described below, with the general advantage that the state variable anchors are designed to remain attached without energy flowing to them, and only when they need to detach will energy be expended.

Figure 2:
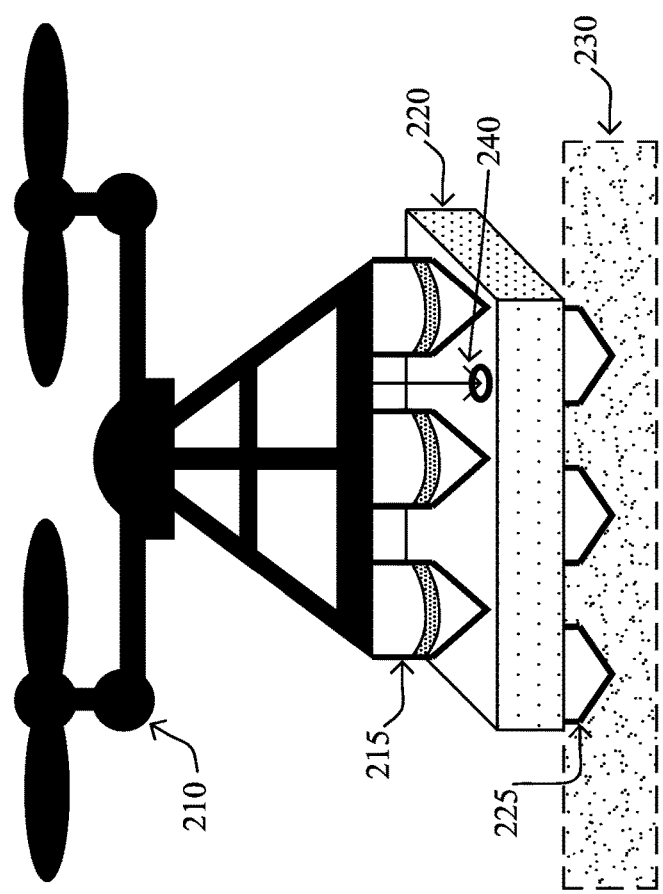
FIG. 2 illustrates an example mobile robot system with state-variable anchors.

Operationally, and with general reference to FIG. 2, an example system 200 comprises a mobile robot 210 for transporting payloads 220 to mounting locations 230 using state-variable anchors to attach the robot to the payload (anchors 215) and state-variable anchors to attach the payload to the mounting location (anchors 225). That is, the two sets of these state-variable anchor systems may be used in one or more embodiments herein where one set temporarily retains the payload to the mobile robot while it is on-route to its final place of installation, and the second set is used to semi-permanently attach the payload to its anchor position (some foundation such as, e.g., objects made of concrete, wood, metal, glass, etc., whether permanent or otherwise). Notably, each anchor 215/225 may consist of a single anchor system, or, as depicted in FIG. 2, may comprise a plurality of separate anchors (e.g., three or more). In addition, as described in greater detail below, an energy transfer mechanism or conduit (e.g., an umbilical connection) 240 may be used to feed power and optionally control data from the mobile robot to the payload while the payload is attached, and also read certain states associated with payload anchors 225.

The mobile robot 210 may comprise any movable robotic device, whether completely autonomous, semi-autonomous, or manually controlled. Example mobile robots are such things as drones (as shown), unmanned aerial vehicles (UAVs), rolling, tracked, or legged robots, boats, submarines, and so on.

Figure 3:
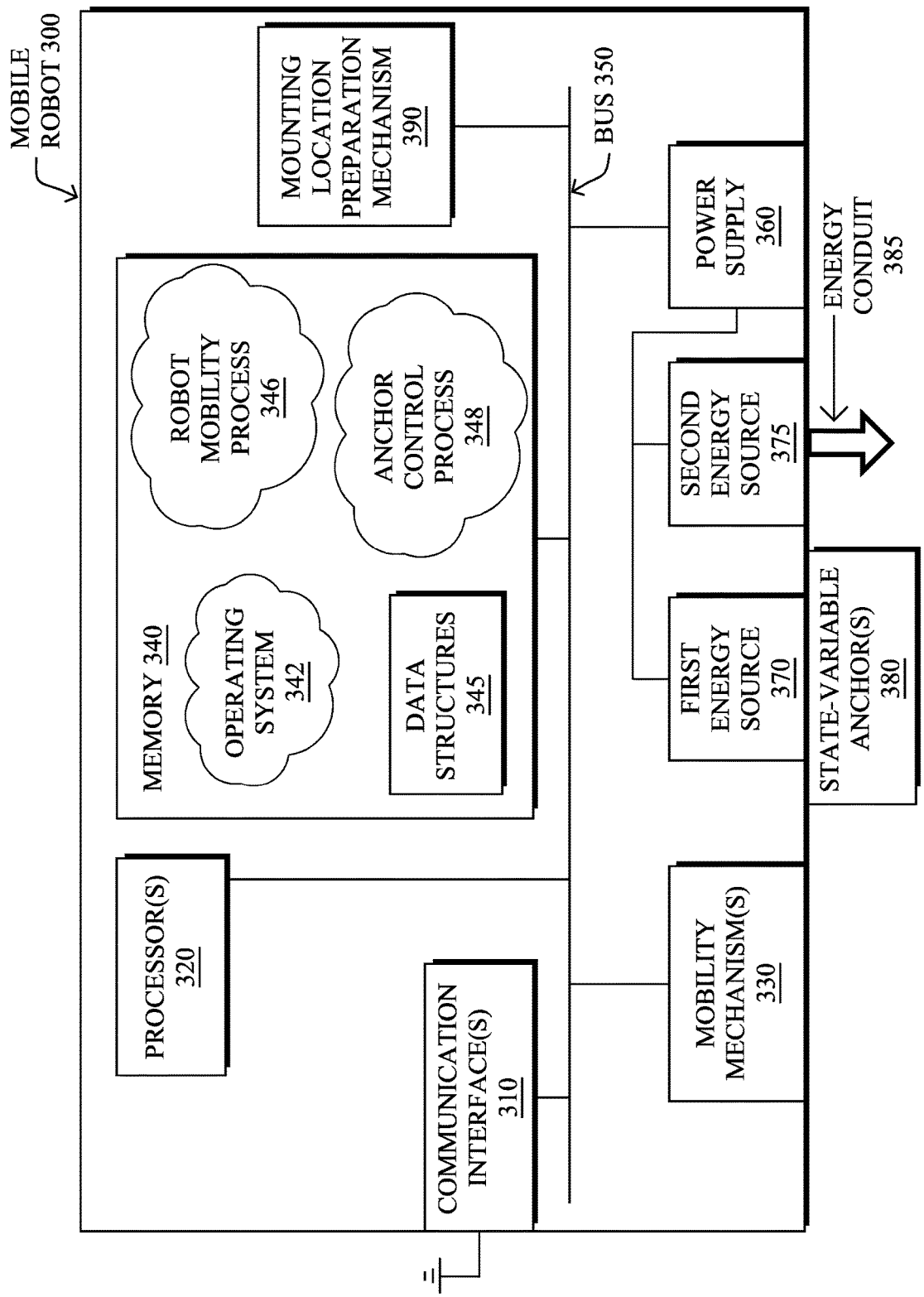
FIG. 3 illustrates an example simplified block diagram of a mobile robot.

FIG. 3 is a simplified schematic block diagram of an example mobile robot 300 that may be used with one or more embodiments described herein (e.g., mobile robot 140 or 210). Illustratively, mobile robot 300 may generally include one or more communication interfaces 310, one or more processors 320, and a memory 340 interconnected by a system bus 350 or other dedicated circuitry, and is powered by a power supply system 360. Additionally, the mobile robot comprises one or more mobility mechanisms 330 configured to move the robot, such as blades, propellers, wheels, treads, legs, and so on, as well as corresponding circuitry and mechanics to control movement and navigation of such mechanism(s). Moreover, as described further below, first and second energy sources 370 and 375 may also receive power from power supply 360, and may be used to energize and also de-energize state-variable anchors 380 of the robot (e.g., anchor 215 above), or else respectively to interface with (e.g., via energy conduit 385), and energize/de-energize, a state-variable anchor of a payload (e.g., anchor 225 of 220 above). Note that other features may also be included within the mobile robot 300, such as various mobility-based sensors (e.g., accelerometers, gyroscopes, GPS, etc.), environmental sensors (e.g., pressure, temperature, etc.), or anchor-based sensors (e.g., anchor state sensors that measure the state of the anchors, such as temperature, magnetic flux, and so on, as described below), and the simplified view herein is merely an example for discussion herein.

The communication interfaces 310 include the mechanical, electrical, and signaling circuitry for communicating data over wireless (and/or wired links) of a communication network. In one embodiment, network interfaces 310 preferably include a wireless interface that supports Wi-Fi, cellular, or other wireless technologies to connect the robot to a nearby Wi-Fi network, 3G/4G cellular data network, or the like. In another embodiment, communication interfaces 310 include an interface for a hardwired network connection such as a 100 Mb/s Power over Ethernet (PoE) port when connected to a docking station (e.g., at a home base), or when the robot is operating on a tether. In another embodiment, communication interfaces 310 may include a near-field communication interface that uses Bluetooth or any of the emerging Internet of Things (IoT) wireless options, to communicatively connect the robot to any other nearby device (including for communication with the transported payload, if available).

Power supply system 360 may be configured to manage the energy needs of the robot. In various embodiments, power supply system 360 may receive charging energy over a PoE network interface, from a solar panel (e.g., located at the top of robot), via an AC power supply line, or from a storage cell (e.g., a battery, an ultra-capacitor, etc.). In general, power supply 360 provides power to both the robot 300 itself (processor/memory, mobility mechanisms, etc.), as well as to the various anchor components/systems of robot (first and second energy sources). However, in alternative embodiments, separate power supplies may be used in any suitable configuration (such as, e.g., for separation of robot control and anchor control). As would be appreciated, power supply system 360 may be sized and configured accordingly, to accommodate any number of different devices and/or functions.

The memory 340 includes a plurality of storage locations that are addressable by the processor(s) 320 for storing software programs and data structures associated with the embodiments described herein. The processor 320 may comprise necessary elements or logic adapted to execute the software programs and manipulate the data structures 345. An operating system 342, portions of which are typically resident in memory 340 and executed by the processor(s) 320, functionally organizes data by, inter alia, invoking operations in support of software processors and/or services executing on the robot. Illustratively, these software processes and/or services may include a robot mobility process 346 to control the general movement of the robot (autonomously, semi-autonomously, or based on received manual signals), and an illustrative anchor control process 348 that is configured to perform the operations described herein. That is, the techniques described herein may be performed by hardware, software, and/or firmware, such as in accordance with the anchor control process 348, which may include computer executable instructions executed by the processor 320 to perform functions relating to the techniques described herein, e.g., in conjunction with robot mobility process 346.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

Note that in one or more embodiments herein, a mounting location preparation mechanism 390 may also be configured to prepare a mounting location for receiving a payload (e.g., the state-variable anchor of the payload) prior to contacting the payload (e.g., the state-variable anchor of the payload) to the mounting location. For instance, the mounting location may be specifically configured to receive the payload and/or anchor, or else may be an unfinished or semi-finished surface (e.g., concrete pad, building/house roof, roadside steel boxes, tops of wooden utility poles, and so on). As such, the embodiments herein may perform a site survey to determine the substation of the mounting location, and may need to clean or clear the site, such as from leaves, trash, grease, standing water, and so on. As such, the mounting location preparation mechanism 390 may comprise (e.g., in addition to rotating blades of a drone to create a down-draft for clearing debris) such things as articulating brushes, rotary brushes, arms, degreasers, carbon dioxide ($CO_2$) solvents, sprays, and so on, depending on the preparation to be made, the particular type and capability of mobile robot (e.g., so as to not overcome robotic navigation/control).

Figure 4:
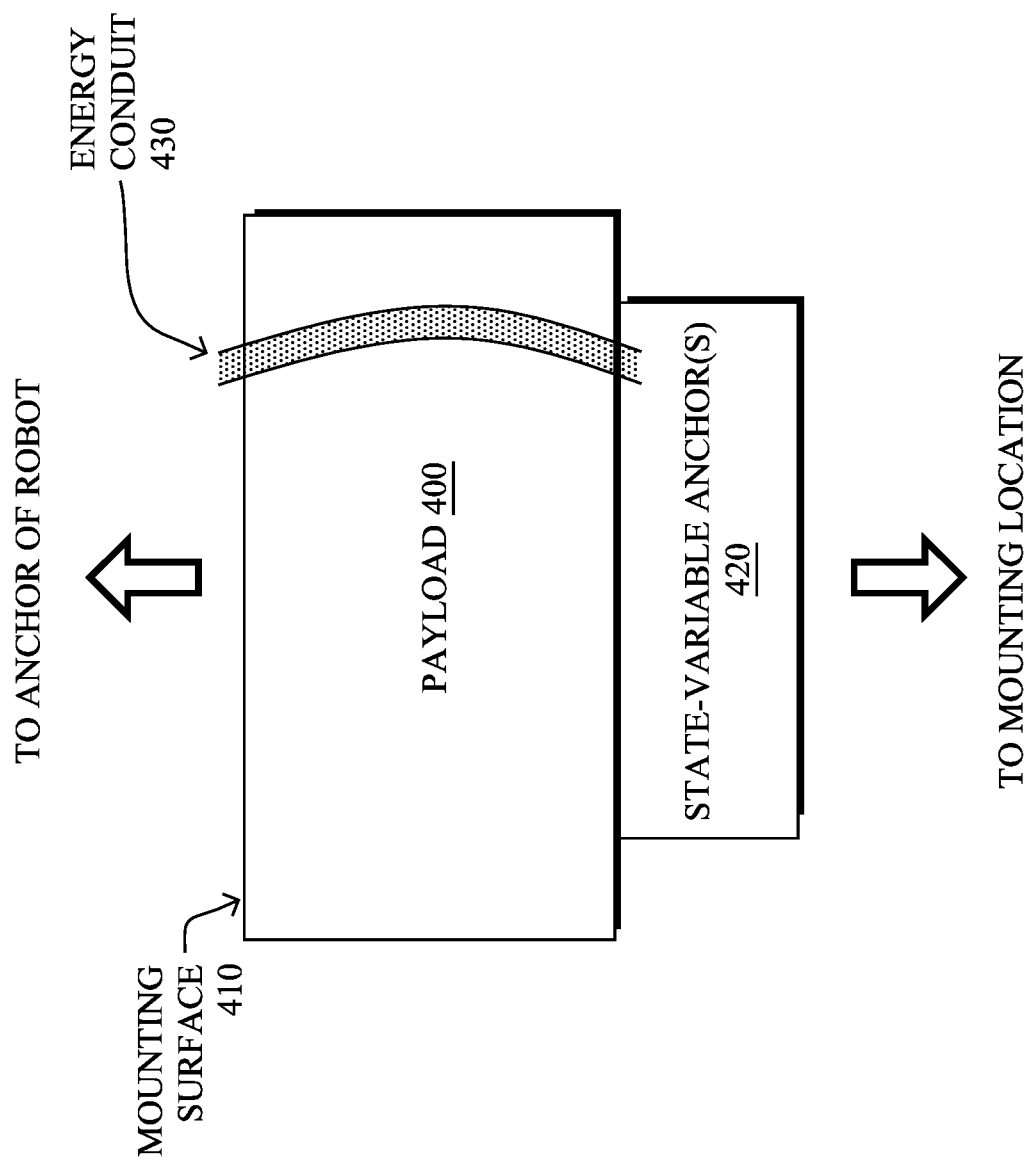
FIG. 4 illustrates an example simplified block diagram of a payload.

FIG. 4 illustrates an example simplified schematic diagram of a payload 400 (e.g., 150 or 220 above). In general, the payload 400 may be any object or device being transported by the mobile robot, such as sensors, access points, wireless network routers, fog modules, other network devices, packages, IoT devices, and so on, and may have operating software and batteries, or else may be simple static objects. Regardless of configuration, according to the techniques herein, a payload 400 may comprise a mounting surface 410 configured to interface with the state-variable anchor 380 of the mobile robot 300, a state-variable anchor 420 (e.g., 225 above) configured to energize into a released state and to de-energize into an anchored state, and an energy conduit 430 configured to pass energy from the mobile robot to the state-variable anchor (e.g., via conduit 385 from second energy source 375 above). Several mechanisms could pass energy from second energy source 375 to energy conduit 430, including electrical contacts/connectors, inductive energy transfer, heat pipes, or the transfer of a heated/cooled fluid, and so on.

The mounting surface 410 may comprise a simple surface material (e.g., plastic, metal, etc.), or may comprise various mating mechanical connectors and interfacing electronic components, which may be configured to provide mechanical alignment and anchoring of the payload to the mobile robot, illustratively by a corresponding state-variable anchor, though in certain embodiments may be a specifically configured mating system (e.g., clasps, grabbers, etc.). The conduit 430 may provide a power connection between the robot and the payload (particularly the state-variable anchor 420 of the payload), though other connections, such as communication connections, cooling or heating connections, and so on, may also make up the interconnect between conduits 385 and 430.

Figure 5A:
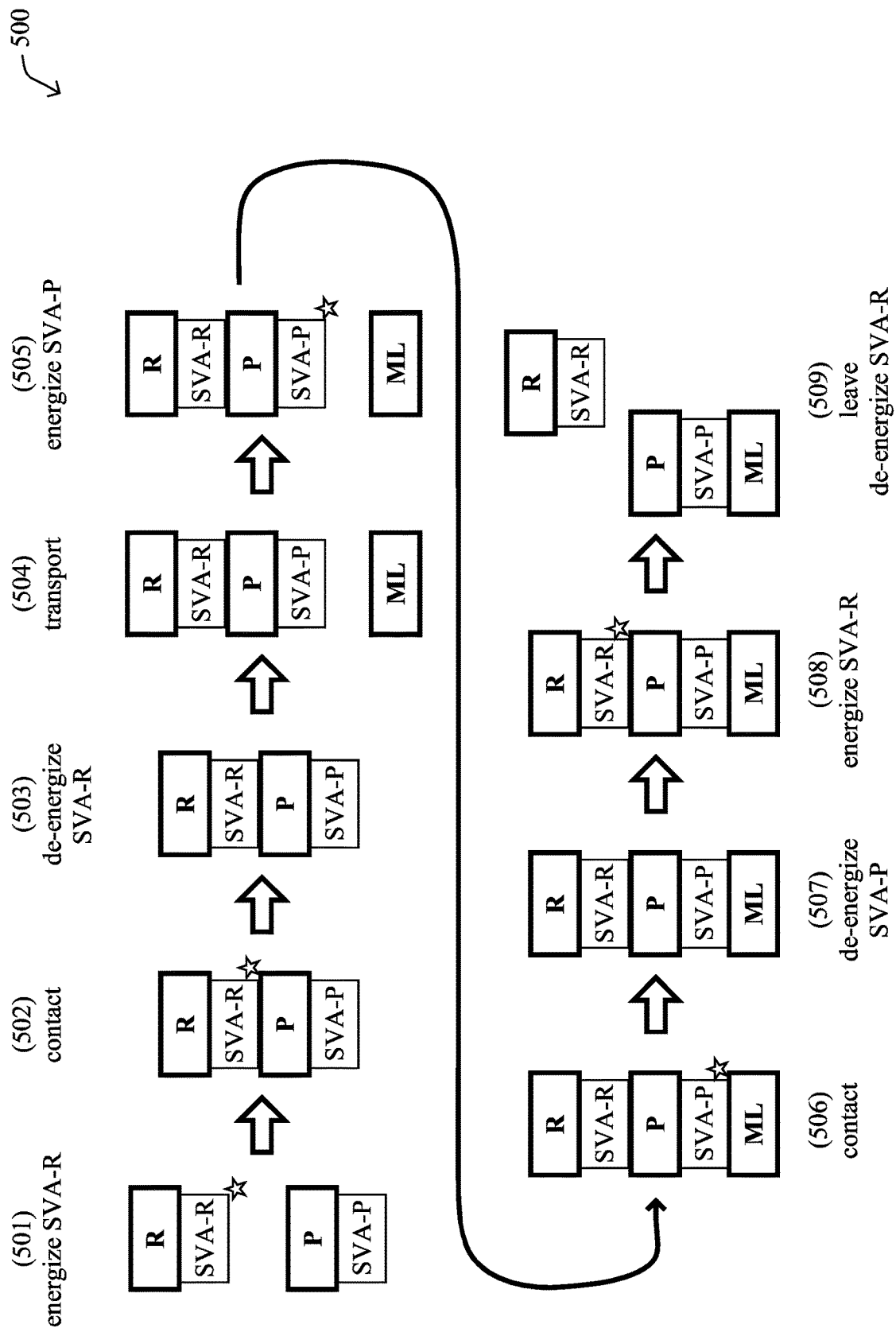
FIGS. 5A-5B illustrate an example of docking and undocking payloads from mobile robots.

According to the present disclosure, the embodiments herein, through the design of the mobile robot 300 and payload 400, can perform novel docking and undocking techniques to securely install payloads at mounting locations, and to retrieve payloads from mounting locations as well. FIG. 5A illustrates an example block flow diagram 500 of a sequence for docking and undocking a payload "P" (e.g., 400 above) from a mobile robot "R" (e.g., 300 above) according to the techniques herein, particularly to securely anchor the payload to a mounting location "ML" (e.g., 230 above) using state-variable anchors of the mobile robot "SVA-R" (e.g., 215/380 above) and state-variable anchors of the payload "SVA-P" (e.g., 225/420 above).

As mentioned above, the state-variable anchor of the robot SVA-R is configured to interface with the payload P, and to remain in an anchored state while de-energized and to change to a released state while energized (e.g., by the first energy source 370 of the robot R). Also, the second energy source 375 is configured to interface with the state-variable anchor of the payload SVA-P (e.g., via conduit 385) and to energize the SVA-P to put it into a released state and to de-energize it to put it into an anchored state. Note the conduit 385 (or local wireless communication, as mentioned above) could alternatively communicate to the payload to use its own energy source, if so equipped, to locally energize its SVA-P.

As shown in FIG. 5A, the illustrative sequence of events to place a payload may occur as follows:

(501) At the robot R's home base (or other location where the payload could be stored/located), the robot's state-variable anchor devices SVA-R may be energized to put it into a released or "ready" state (energized state being denoted by the star).

(502) The robot R and payload P to be transported are moved into position with each other (either moving the robot to the payload, or moving the payload to the robot), contacting the robot R and payload P, or more specifically, contacting the SVA-R in the released state to the mounting surface of the payload P (i.e., energizing the state-variable anchor SVA-R while contacting the payload P). (Note that energizing the state-variable anchor of the mobile robot SVA-R while contacting the payload P may imply either first contacting the SVA-R to the P and then energizing the SVA-R, or else may energize first and then contact the P while energized.)

(503) The robot's state-variable anchor system SVA-R is then de-energized, while contacting the payload P, creating a strong retention force between the payload and the robot (thus attaching the payload P to the state-variable anchor SVA-R). This force may generally be many times the weight of the payload, ensuring that it won't accidentally drop off of the robot during transport. In other words, the state-variable anchor of the mobile robot SVA-R is configured to attach to the mounting surface of the payload P by energizing into a released state while contacting the mounting surface, and then de-energizing while still contacting the mounting surface to change to an anchored state with the mounting surface. As such, the state-variable anchor of the mobile robot SVA-R remains in the anchored state with the mounting surface of the apparatus while de-energized and while transporting the payload P. (Note that at this time, the energy conduits 385/430 may be connected through various techniques, such as magnetic electrical connectors, compression fittings, induction coils, heat pipes, a connecting control mechanism, merely being in contact with each other, and so on.)

(504) The mobile robot R moves the attached payload P from its stored location (e.g., home base) to the desired installation position. Notably, because the state-variable anchors require no static power when attached, the robot's travel range is not compromised by continuous expenditure of energy to retain its payload.

(505) Upon reaching the destination mounting location ML, the robot R may then drive power through its umbilical connector (energy conduit 385) past its own state-variable anchors SVA-R to activate the state-variable anchors of the payload SVA-P into their released/unlatched state.

(506) The mobile robot R then maneuvers to position the payload P, and its state-variable anchors SVA-P, exactly where required on the mounting location ML, perhaps gently pressing the payload into position on its new foundation. (Note here also that energizing the state-variable anchor of the payload SVA-P while contacting a mounting location ML may imply either first contacting the SVA-P to the ML and then energizing the SVA-P, or else may energize the SVA-P first and then contact the ML while energized.)

(507) While contacting the energized (and released) SVA-P to the mounting location ML, the robot R may then attach the payload to the mounting location by de-energizing (cutting power to) the state-variable anchor SVA-P to put the SVA-P into the anchored position (e.g., latching), thus permanently or semi-permanently affixing the payload into position. In other words, energizing the state-variable anchor SVA-P into the released state (e.g., via the energy conduit 385) while the state-variable anchor SVA-P is contacting a mounting location ML, and then de-energizing the state-variable anchor SVA-P into the anchored state while contacting the mounting location ML, thus attaching the payload to the mounting location. Notably, because the state-variable anchors SVA-P require no static power when attached, the payload's energy use or battery life is not compromised by the need to expend continuous energy to remain anchored.

(508) After the payload P is attached to the mounting location ML, the robot R energizes its state-variable anchors SVA-R in order to release the payload from the robot (i.e., energizing the state-variable anchor SVA-R detaches the state-variable anchor SVA-R and thus the robot R from the payload P). Note that the robot R may need to pull away from the payload P in order to complete the release while the SVA-R energized. Note that the pulling action may be designed specifically so detachment is assured within the safe force application envelope of robot R and payload P. Any conduit or umbilical connections may then disconnect (e.g., a separation control mechanism or else a break-away mechanism, such as magnetic electrical connectors, compression fittings, merely separating, and so on).

(509) Once released, the robot R may then de-energize its state-variable anchor SVA-R to conserve energy for the return trip back to its home base for its next mission, leaving the payload P behind and securely attached to the mounting location ML.

Figure 5B:
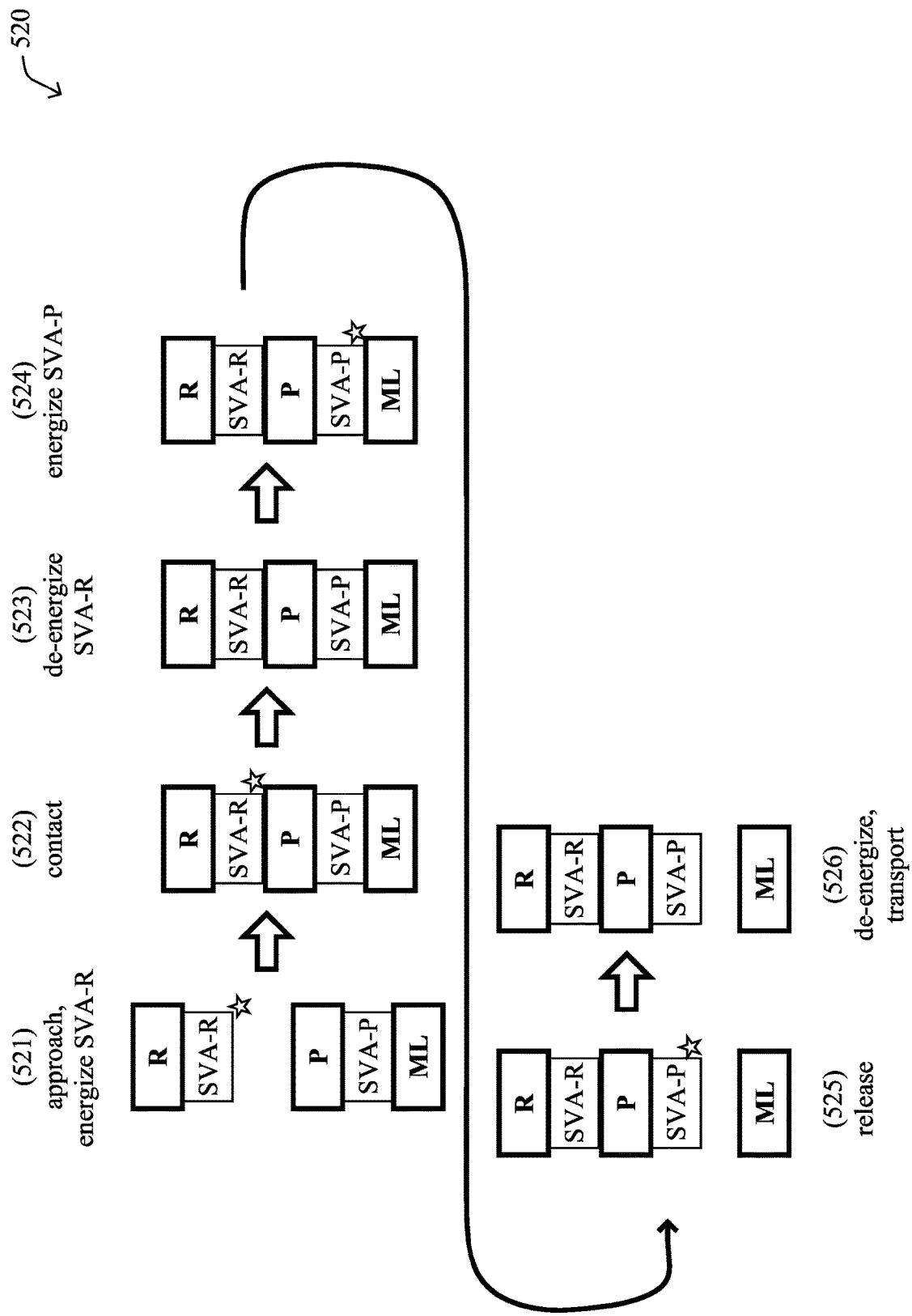

Turning now to FIG. 5B, another example block flow diagram 520 is shown of a sequence for docking and undocking a payload P from a mobile robot R according to the techniques herein, particularly now to retrieve a payload from a mounting location ML. For example, it may be necessary or generally desired to retrieve the payload P from the mounting location ML for various reasons, such as for repairs, updates, battery replacement, removal of the payload (e.g., mission complete, etc.), and so on. An illustrative sequence of events 520 to retrieve a payload may thus occur as follows:

(521) The robot R approaches the payload P, which is attached to the mounting location ML, and energizes the state-variable anchor of the mobile robot SVA-R, putting the SVA-R into the released/ready state.

(522) The robot R performs alignment (e.g., fine alignment) to the mounting surface of payload P (perhaps through the aid of optical or other sensors), and contacts the energized state-variable anchor SVA-R to the payload P (notably either energizing then contacting or contacting then energizing, as mentioned above). Note also that the contacting also connects the energy conduit 385 of the robot R to the payload's energy conduit 430, as described above.

(523) The state-variable anchor SVA-R may then be de-energized while contacting the SVA-R to the payload P to attach the payload P to the mobile robot (i.e., to SVA-R).

(524) While the payload P is still attached to the state-variable anchor of the mobile robot SVA-R, the robot energizes the state-variable anchor of the payload SVA-P (e.g., via the conduits) in order to put the SVA-P into the released state.

(525) The payload P may now be detached from the mounting location ML. That is, by putting the payload's state-variable anchor SVA-P into the energized release state, the payload P (the SVA-P) can be separated from the mounting location.

(526) The SVA-P can then be de-energized, and now both SVA-P and SVA-R are de-energized (with SVA-R securely attached to the payload P), so that the mobile robot R can then return home or move to a next mounting location with the attached payload P.

According to one or more embodiments of the present disclosure, the above (and other) sequences may be enabled in a number of ways, using any one or more of a plurality of different anchoring or "affixing" techniques to establish a state-variable anchor. As noted above, a state-variable anchor attaches/anchors and detaches/releases upon command, particularly where deactivation (de-energizing) of the anchor creates an anchored state (so no power is used while anchored), and activation (energizing) of the anchor releases the anchor (so power is only used during the action of attaching or detaching the payload). FIGS. 6A-10B below illustrate several different newly defined embodiments of such state-variable anchors according to the techniques herein.

Figures 6A, 6B:
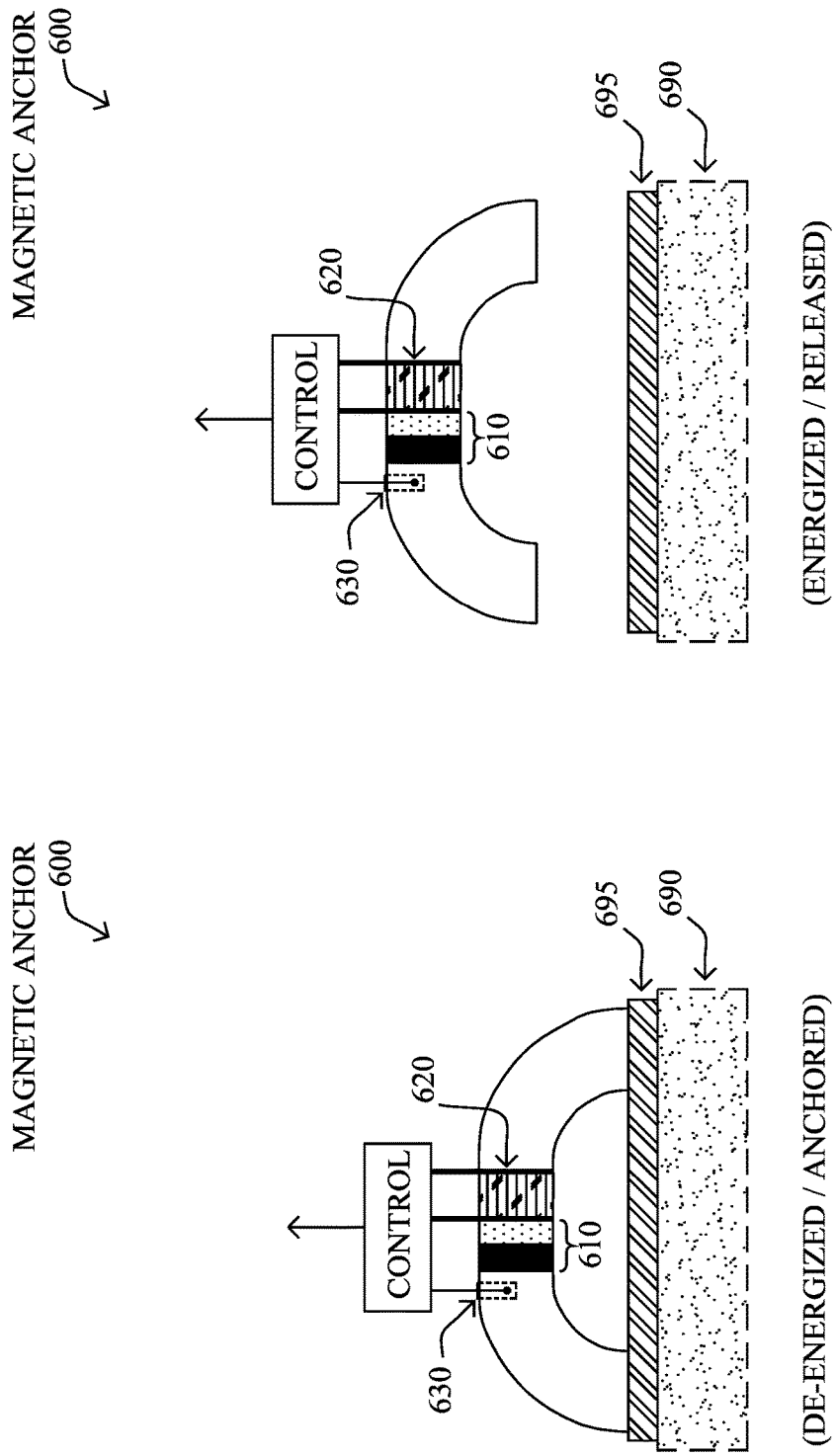
FIGS. 6A-6B illustrate an example of a state-variable anchor as a magnet-based anchor.

FIGS. 6A-6B, for instance, illustrate a magnet-based anchor 600, where a permanent magnet 610 of the magnet-based anchor provides a de-energized anchor state to an opposing ferromagnetic surface 690 (mounting surface of the payload and/or the mounting location) as shown in FIG. 6A, and where an electromagnet 620 of the magnet-based anchor energizes to counteract the permanent magnet 610 to put the magnet-based anchor into an energized released state as shown in FIG. 6B. Said differently, this combination of permanent magnets and electromagnets to attach and release objects comprises a magnetic circuit created through magnetic materials that comprise the anchor. This circuit may illustratively consist of a permanent magnet 610 (e.g., with two pole pieces, such as metallic arcs as shown or otherwise, to extend the magnet) and a coil/windings of conductive wire surrounding one pole piece forming an electromagnet 620. The portion of the object 690 that the anchor is to attach to must be magnetic, or have a thin magnetic plate attached (e.g., 695 as shown). There may also be a magnetic flux sensor 630 that measures the amount of magnetism flowing in the magnetic circuit. When the coil is not energized the permanent magnet strongly energizes the magnetic circuit, and if any magnetic object (e.g., steel plate, bridge I-beam, automotive roof, etc. with iron, nickel, cobalt, or their alloys) is nearby, it will create a strong attractive force, and the anchor system's magnetic circuit will securely hold the anchor to the object. However, if the control system energizes the coil at the correct polarity, and with a coil current (e.g., 10-50 watts, or otherwise sufficient based on the magnetic force of permanent magnet 610) that creates a field strength that is equal and opposite the field strength of the permanent magnet in the magnetic circuit, the retention force is cancelled and the anchor is released from the object. The magnetic flux sensor acts in a feedback loop with coil current and control circuits to drive the magnetic circuit net flux to zero, and the anchor releases cleanly. Note that other mechanisms may also be included, such as one or more springs to not require a gravity-based disconnect, and the view shown herein is merely a simplified example.

Figure 7B:
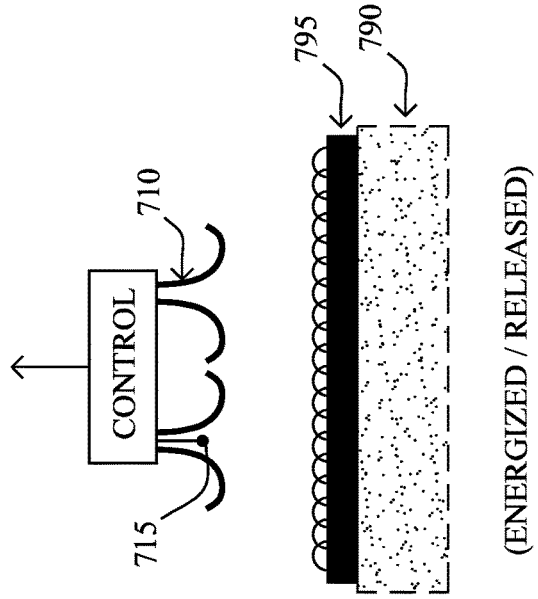
FIGS. 7A-7B illustrate an example of a state-variable anchor as a hook-and-loop-based anchor.
Figure 7A:
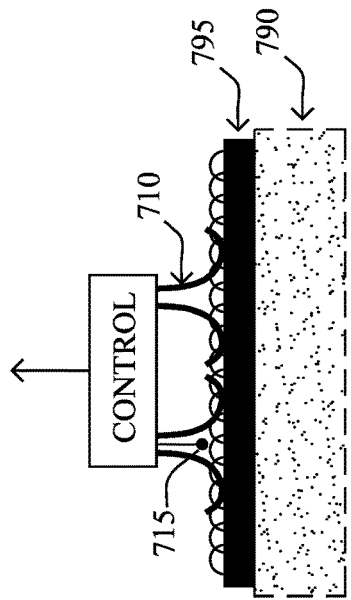

FIGS. 7A-7B illustrate another example embodiment of a state-variable anchor herein, namely a state-variable hook-and-loop-based anchor 700, where an array of shape memory alloy wires 710 of the hook-and-loop-based anchor are shaped as hooks while de-energized (FIG. 7A) and straightened while energized (FIG. 7B). The wires 710 as hooks provide a de-energized anchor state when mated into an array of loops 795 of an opposing surface 790, and the wires straightened provide an energized released state by not mating with or entangling in the array of loops. For example, wires made of shape memory alloy (such as Nickel-Titanium, or "NiTinNol") may be configured to straighten on command when resistance heated, and when de-energized they form hooks, entangling with the static loops 795 (e.g., a tangle or open weave of fibers (e.g., stainless steel, carbon fiber, Kapton polyamide fibers, etc.) that is designed to strongly retain the hooks when they are not energized, but cleanly release them when they are). That is, the wires and loops are similar to conventional hook-and-loop fasteners, but different in that the wires can be electrically commanded to release with very little force. In one embodiment, the alloy may be trained during manufacture to have approximately a 180-degree bend when not heated above its critical temperature, forming a hook (FIG. 7A), and when heated above a critical temperature (also known as the "phase transition temperature"), the hook straightens out (FIG. 7B). This heating can be accomplished by passing an electric current through the shape memory alloy wire. When shaped as hooks, as shown in FIG. 7A, the wires 710 can ensnare some of the loops 795 to retain the payload or to attach to a prepared mounting location. When above their critical temperature, the wires 710 are basically straight as shown in FIG. 7B, enabling them to pass through the loops to affix to or separate from the loops 795. Note that there may also be a temperature sensor 715 that monitors the temperature of the wires as they heat, to ensure that the correct heating current is supplied by the control circuits. To attach the anchor, the loop component 795 may be permanently attached to an object with adhesive, tape, or fasteners. The hook component may be energized by passing a current through the circuits of shape memory alloy, and they straighten. Then the hooks are moved by the robot into position to intermingle with the loops, and the current is removed. In just a moment, the hooks cool below their critical temperature ("de-energized"), revert to their hook shape, and inter-tangle with the loops, thus retaining the anchor. (Note that although only four hooks are shown, practical systems would likely have many more (e.g., a dozen or more), and not all hooks need to be attached in order to securely attach the wires to the loops. In an alternate embodiment, the array of loops 795 is replaced with other structures that the hooks 710 can entangle with, for example open-weave fabrics, screens, or arrays of holes in component 795.

As still another example of a state-variable anchor according to the techniques herein, FIGS. 8A-8B illustrate a melting-adhesive-based anchor 800, where a container (e.g., cup) 810 has a heating element 820 to change an adhesive 830 from a de-energized (cooled/solidified) state (FIG. 8A) to an energized melted state (FIG. 8B). That is, anchor 800 provides a de-energized anchor state when adhered to an opposing surface 890 (or simply de-energized and solidified when in transit without being attached to anything), and the adhesive in an energized release state (heated/melted) does not adhere to surfaces in order to conform in a liquefied state before de-energizing and adhering, or else for removal from a previously adhered surface. For example, a low-temperature hot melt adhesive 830 may interact with electric heaters 820 to melt and release the adhesive upon command. For instance, a small wafer of temperature sensitive adhesive may be inserted into a shallow cup 810, and a resistance heater 820 melts the adhesive, and it fills the cup and it is retained by surface tension. When the heaters are no longer energized the adhesive rapidly cools and solidifies. A temperature sensor in the cup may be used to measure the temperature of the adhesive, and informs the control system when the adhesive is adequately melted, or correctly solidified. To attach the anchor 800, the heater is energized, melting the adhesive wafer to the prescribed temperature, as measured by the sensor. A meniscus forms where the adhesive is slightly over the rim of the cup. The anchor is pressed onto the object to which it is to be mounted, wetting the surface with the adhesive, and the heaters are cut off. In a few moments, the hot melt adhesive solidifies, permanently attaching the cup onto the object's surface. Several different adhesive formulations could be available, chosen to be compatible with whatever surface the anchor is intended to be stuck to. Re-energizing the heaters will melt the adhesive in the cup, and release the anchor (although a portion of the adhesive may remain on the surface after the anchor is removed).

FIGS. 9A-9B illustrate still another embodiment of a state-variable anchor as a shape memory polymer (SMP)-based anchor 900, wherein one or more SMP tentacles 910 of the SMP-based anchor 900 re-shape into a release position while energized (FIG. 9A), and de-energize into an anchor position (FIG. 9B). The one or more SMP tentacles provide a de-energized anchor state when mated to a receiving structure 920, and the one or more SMP tentacles provide an energized released state by not mating with the receiving structure. Said differently, a dual-state tentacle uses "4D"-printed shape-memory polymers (SMP) fashioned into moving "tentacle" grips (where, for example, "4D" implies height, width, depth, and a specific material composition to enable reshaping under certain conditions). For example, in anchoring situations that involve depositing sensors on unusual bases such as on wires or rods, or within or on top of small cavities, crevices, or cracks, it would be advantageous to deploy a "dual-state" tentacle as shown in FIGS. 9A-9B, where a tab, cylinder, or finger of 4D-printed material (SMP) is printed in an initial configuration. As shown, the energized state of the tentacle 910 in FIG. 9A is a straightened shape, and then a de-energized state returns the tentacle to a curved/hook shape. Alternatively, the tentacle may be printed in a straightened shape, where energizing the tentacle transitions the tentacle to the curved state, where it remains while de-energized. (Note that this particular embodiment may not allow for returning the tentacle back to the straightened state, so other techniques need to be used to retrieve payloads.) For instance, applying heat temporarily to the material (e.g., via an external coil or integral resistance-heated filament or a heated air jet) causes it to transform into a secondary shape that may be used to grip, lodge, or wedge an anchor onto (or into) locations not well served by other attachment methods. In addition, collections or arrays of tentacles can be employed sequentially or simultaneously to achieve the desired gripping effect. Conversely, as noted above, the tentacles could start in a curved or "gripping" state and phase transition to a substantially straight secondary position to release from an anchoring site. One advantage with this method is that printed "tentacles" may be formed in a limitless range of initial and secondary size and configuration, providing more design flexibility than wire shape-memory alloys. One example use case of this sort of anchor would be to attach a sensor payload to the aluminum cross-bar of an outdoor street light fixture.

FIGS. 10A-10B show one additional embodiment where the state-variable anchor comprises a suction-based anchor 1000, where one or more suction cups in a de-energized state provide a de-energized anchor state when suctioned to an opposing surface 1090 (FIG. 10B), and in an energized state provide an energized release state by not suctioning to the opposing surface (FIG. 10A). In one specific embodiment, for example, a sealed chamber 1010 may comprise a shape memory alloy (SMA) extension spring 1012 and a common exterior return spring 1014 coupled to a movable diaphragm ("sticky elastomer skirt") 1020 to create an on-demand "sucker" grip. For instance, for anchoring to hard, smooth surfaces, a vacuum-activated "sucker" type of device may be appropriate, where accomplishing the suction action may be achieved by using a sealed chamber that contains two collinear springs attached to a deformable elastomeric diaphragm fashioned into a round skirt. As seen in FIGS. 10A-10B, the interior spring may be made from a shape-memory alloy (SMA) that extends when heated by briefly (e.g., 1-2 seconds) running electric current through it. The extending spring pushes on the diaphragm, expelling some air from under the skirt. Once the current is removed and as the SMA spring cools, the exterior spring returns the SMA spring and diaphragm to their previous undistorted shape. This action draws a vacuum in the skirt, fixing the assembly to the anchor surface. Repeating the procedure will release the assembly from the anchor site. In addition to the above features, it may be advantageous to make the skirt from a "tacky" elastomeric material to help facilitate sucker grip action. An array of suckers may also be useful to increase or otherwise tailor grip force.

Note that while certain embodiments of state-variable anchors are shown and described above, others may of course be designed and used with the techniques herein. Note also that the anchors to be used may be selected or used in combination based on knowledge of the application site or based on the payload to be delivered. For instance, a plurality of payloads with different functions and anchor types may be available for selection by the mobile robot, such that the mobile robot can chose the appropriate state-variable anchor (e.g., magnetic for steel, adhesive for aluminum, hook-and-loop for prepared surfaces, hot-melt for rough surfaces, etc.) and associated payload (e.g., based on using an identifier such as a bar code, radio frequency identifier or "RFID" to select the correct payload).

Moreover, the state-variable anchors of the mobile robot need not be the same as the state-variable anchors of the payload (i.e., the state-variable anchor of the mobile robot and the state-variable anchor of the payload may comprise different types of state-variable anchors.) In fact, the robot-to-payload connection can be a standard connection (e.g., specifically designed interface, grabber, click-in-place, etc.), where the payload-to-mounting-location connection may be specifically configured as the state-variable anchor system herein. Also, prior to moving a payload from a home base to a desired location, the payload may be anchored to its storage location (e.g., for security, for mobile "perches" moving a plurality of payloads near a location to be moved the final leg by the mobile robot, and so on).

Furthermore, though many of the embodiments described above detail a reversible process for state-variable anchors (e.g., the ability to energize into one state and de-energize into another), certain embodiments of state-variable anchors may be a single-transition type of anchor, where the anchors (e.g., SMAs or SMPs) change from an initial state to a changed state, and then cannot be "un-changed". For example, heating a wire above a critical temperature may cause an initial shape change, where removing the heating source will not cause a reversal of this change back to the original shape. In such embodiments, the techniques herein may thus be directed to permanent installations, or else an opposing force may be used (e.g., a weight, spring, etc.) to return the material to its pre-heated shape.

Figure 11:
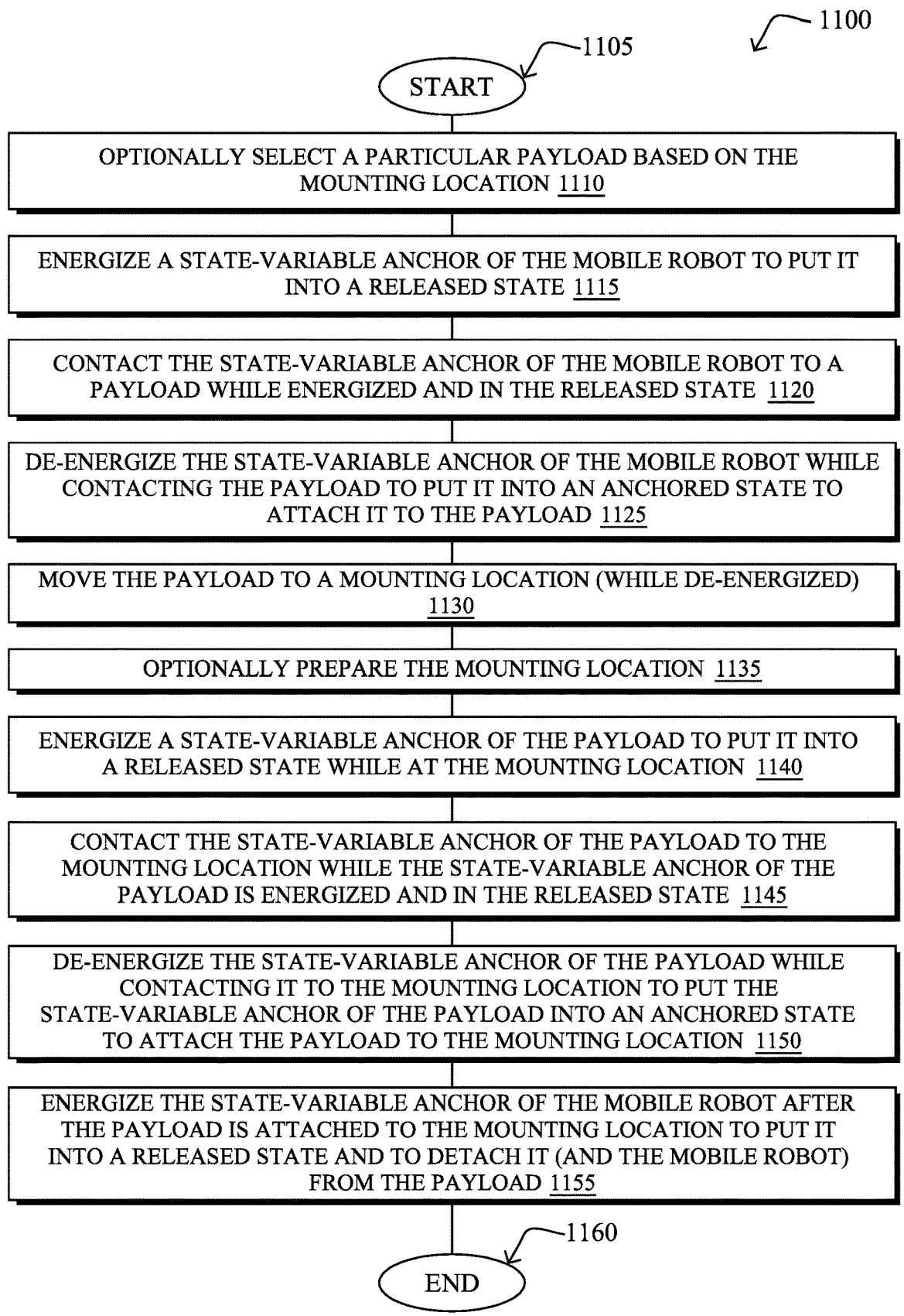
FIG. 11 illustrates an example simplified procedure for docking and undocking a payload from a mobile robot, particularly for anchoring the payload to a mounting location.

In closing, FIG. 11 illustrates an example simplified procedure for docking and undocking payloads from mobile robots in accordance with one or more embodiments described herein, particularly for anchoring the payload to a mounting location. For example, a non-generic, specifically configured device (e.g., mobile robot 300) may perform procedure 1100 by executing stored instructions (e.g., process 348). The procedure 1100 may start at step 1105, and continues to step 1110, where, as described in greater detail above, a mobile robot optionally selects a particular payload from a plurality of options based on the particular payload having a particular state-variable anchor suited for the mounting location. Once the payload is selected (as an option or as a default), then in step 1115 the mobile robot energizes a state-variable anchor of the mobile robot to put the state-variable anchor of the mobile robot into a released state. By contacting the state-variable anchor of the mobile robot to a payload while the state-variable anchor of the mobile robot is energized and in the released state in step 1120, and then de-energizing the state-variable anchor of the mobile robot while contacting the payload in step 1125 to put the state-variable anchor of the mobile robot into an anchored state, the payload attaches to the state-variable anchor of the mobile robot.

In step 1130, the mobile robot may then move the payload to a mounting location while the state-variable anchor of the mobile robot is de-energized in the anchored state and attached to the payload. Optionally, in step 1135, the mobile robot may prepare the mounting location for receiving the state-variable anchor of the payload prior to contacting the state-variable anchor of the payload to the mounting location.

In step 1140, the mobile robot energizes a state-variable anchor of the payload to put the state-variable anchor of the payload into a released state while at the mounting location, and in step 1145 contacts the state-variable anchor of the payload to the mounting location while the state-variable anchor of the payload is energized and in the released state. The mobile robot may then de-energize the state-variable anchor of the payload while contacting the state-variable anchor of the payload to the mounting location in step 1150 to put the state-variable anchor of the payload into an anchored state to attach the payload to the mounting location. Note that in certain embodiments, the mobile robot may apply force on the payload toward the mounting location while contacting the state-variable anchor of the payload to the mounting location while the state-variable anchor of the payload is energized and in the released state and while de-energizing the state-variable anchor of the payload while contacting the state-variable anchor of the payload to the mounting location.

In step 1155, the mobile robot may then energize the state-variable anchor of the mobile robot after the payload is attached to the mounting location to put the state-variable anchor of the mobile robot into a released state and to detach the state-variable anchor of the mobile robot and the mobile robot (and energy umbilical) from the payload. The procedure 1100 may then end in step 1160 with the mobile robot detached from the payload, and returning to its origin (e.g., for moving and mounting another payload).

Figure 12:
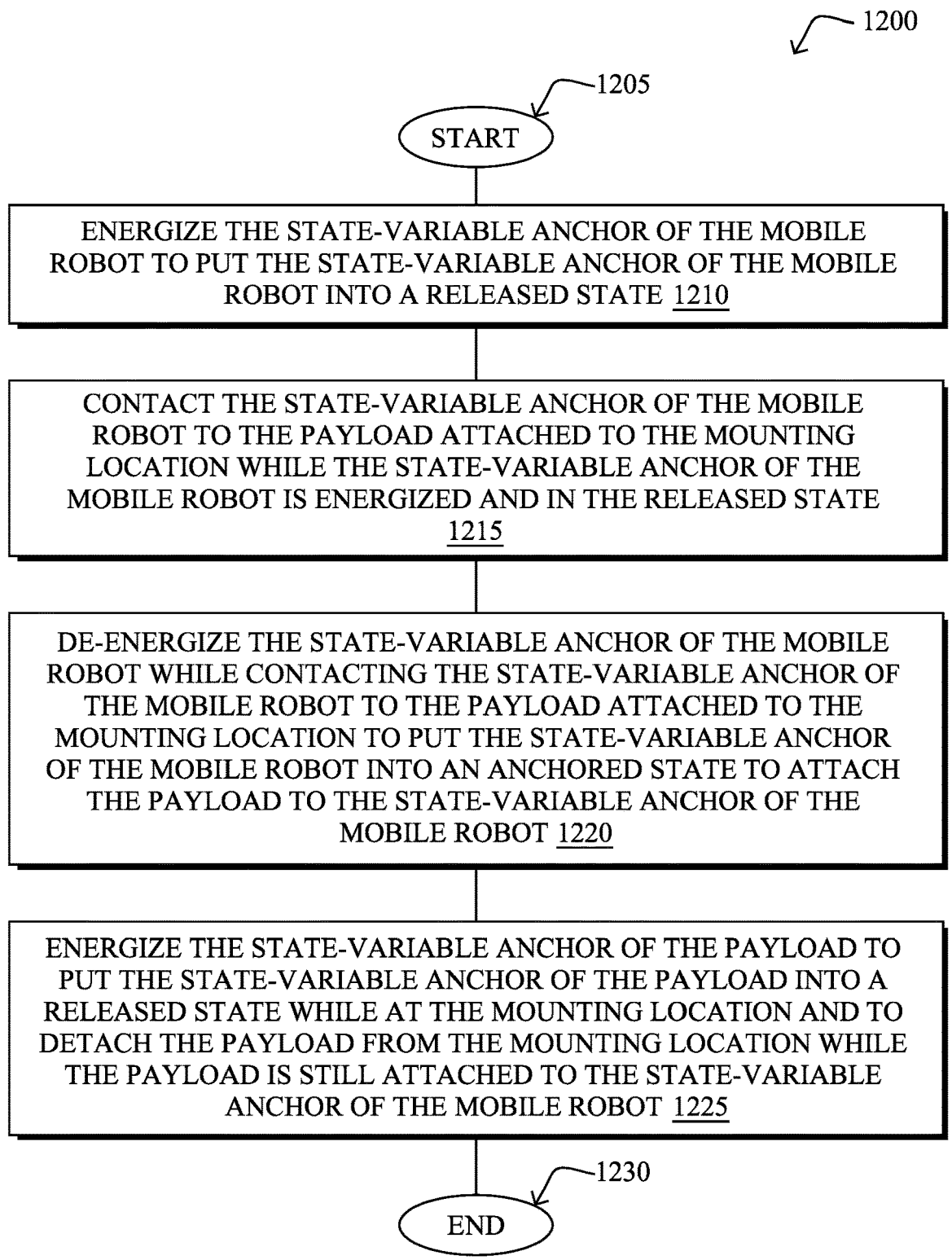
FIG. 12 illustrates an example simplified procedure for docking and undocking a payload from a mobile robot, particularly for retrieving the payload from a mounting location.

In addition, FIG. 12 illustrates another example simplified procedure for docking and undocking a payload from a mobile robot in accordance with one or more embodiments described herein, particularly for retrieving the payload from a mounting location. The procedure 1200 may start at step 1205, and continues to step 1210, where, as described in greater detail above, the mobile robot energizes its state-variable anchor to put the state-variable anchor of the mobile robot into a released state, and then in step 1215 contacts the state-variable anchor to the payload, which is attached to the mounting location, while the state-variable anchor of the mobile robot is energized and in the released state. Accordingly, in step 1220, the mobile robot de-energizes its state-variable anchor while it is contacting the payload (still attached to the mounting location) to put the state-variable anchor of the mobile robot into an anchored state to attach it to the payload. Then, by energizing the state-variable anchor of the payload (e.g., through the energy umbilical) in step 1225 to put the state-variable anchor of the payload into a released state while at the mounting location, the mobile robot may detach the payload from the mounting location (while the payload is still attached to the state-variable anchor of the mobile robot). The procedure 1200 may then end in step 1230, with the mobile robot and attached payload leaving the mounting location behind.

It should be noted that while certain steps within procedures 1100-1200 may be optional as described above, the steps shown in FIGS. 11-12 are merely examples for illustration, and certain other steps may be included or excluded as desired. For example, during any of the energizing or de-energizing steps, the device (e.g., robot) may monitor feedback from one or more anchor state sensors for any of the state-variable anchors, and, may determine an appropriate energy flow for the state-variable anchors based on the feedback, accordingly. Further, while a particular order of the steps is shown, this ordering is merely illustrative, and any suitable arrangement of the steps may be utilized without departing from the scope of the embodiments herein. Moreover, while procedures 1100-1200 are described separately, certain steps from each procedure may be incorporated into each other procedure, and the procedures are not meant to be mutually exclusive.

The techniques described herein, therefore, provide for docking and undocking payloads from mobile robots. In particular, the techniques herein provide a novel arrangement of two layers of anchors, one temporarily retaining a payload to the robot, and a second semi-permanently anchoring the payload to an object in the environment. The present disclosure further provides for specific embodiments of the state-variable anchors, as well as the control systems that manage them. Considering the projections that show tens of billions of IoT devices being initially deployed over the next several years, some of which being in remote and/or harsh locations (or even unreachable by a worker), and requiring ongoing maintenance and upgrade, the techniques herein provide a valuable system for securely transporting and mounting payloads with mobile robots.

While there have been shown and described illustrative embodiments that provide for docking and undocking payloads from mobile robots, it is to be understood that various other adaptations and modifications may be made within the spirit and scope of the embodiments herein. For example, while certain embodiments are described herein with respect to certain environments, such as computer networks (e.g., IoT, Fog, etc.), sensors, access points, etc., the payloads are not limited as such and may be used for other functions, in other embodiments, such as for package/parcel delivery, decorations, building or other architecture purposes, and so on.

Note also that the embodiments herein may be extended to addition "levels" of anchors. For instance, in one embodiment three or more layers of anchors may be used in series. For example, there could be a base platform attached to a mounting location by an SVA-P (e.g., containing basic sensor platform functions like processing, storage, energy, and wireless links), an intermediate layer that contains the actual sensing elements (for example, if this device is an image sensor, the intermediate layer could contain either video, IR, or LIDAR sensors), a new layer of state variable anchors (e.g., "SVA-S") to attach the sensing element to the base platform, and the SVA-R anchors as described above to attach the sensing elements to the robot. In this environment, there could be multiple layers of umbilical connections, so the mobile robot could control if it is going to release at the SVA-P or SVA-S levels of anchors. Still further anchor layers may be used, and the techniques herein are thus not limited to two sets anchors, accordingly.

In addition, while certain types of mobility mechanisms and certain mobile robots have been shown, they are merely examples of possibilities contemplated herein, and other suitable mobile robot configurations may be used, accordingly. Also, the Figures have been shown in certain configuration/orientations, though it should be noted that these illustrations are not meant to be limiting, and the various components of the different devices (robots, payloads, etc.) may be located on the same sides, different sides, opposing sides, top or bottom of the robot, as singular or separate components, etc., as will be readily understood by those skilled in the art. Mounting may be vertical, horizontal, off-angle, from the top, from the bottom, etc.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:
   energizing, by a mobile robot, a state-variable anchor of the mobile robot to put the state-variable anchor of the mobile robot into a released state;
   contacting, by the mobile robot, the state-variable anchor of the mobile robot to a payload while the state-variable anchor of the mobile robot is energized and in the released state;
   de-energizing, by the mobile robot, the state-variable anchor of the mobile robot while contacting the payload to put the state-variable anchor of the mobile robot into an anchored state to attach the payload to the state-variable anchor of the mobile robot;
   moving, by the mobile robot, the payload to a mounting location while the state-variable anchor of the mobile robot is de-energized in the anchored state and attached to the payload;
   energizing, by the mobile robot, a state-variable anchor of the payload to put the state-variable anchor of the payload into a released state while at the mounting location;
   contacting, by the mobile robot, the state-variable anchor of the payload to the mounting location while the state-variable anchor of the payload is energized and in the released state;
   de-energizing, by the mobile robot, the state-variable anchor of the payload while contacting the state-variable anchor of the payload to the mounting location to put the state-variable anchor of the payload into an anchored state to attach the payload to the mounting location; and
   energizing, by the mobile robot, the state-variable anchor of the mobile robot after the payload is attached to the mounting location to put the state-variable anchor of the mobile robot into a released state and to detach the state-variable anchor of the mobile robot and the mobile robot from the payload,
   wherein the state-variable anchor of the mobile robot comprises a first magnetic circuit including a permanent magnet and an electromagnet that is configured to be energized and de-energized by the mobile robot,
   wherein, when the electromagnet of the first magnetic circuit is de-energized by the mobile robot, the permanent magnet of the first magnetic circuit is operable to anchor the state-variable anchor of the mobile robot to a first opposing ferromagnetic surface,
   wherein, when the electromagnet of the first magnetic circuit is energized by the mobile robot, the electromagnet of the first magnetic circuit is operable to counteract the permanent magnet of the first magnetic circuit so as to release the state-variable anchor of the mobile robot from the opposing first ferromagnetic surface,
   wherein the state-variable anchor of the payload comprises a second magnetic circuit including a permanent magnet and an electromagnet that is configured to be energized and de-energized by the mobile robot,
   wherein, when the electromagnet of the second magnetic circuit is de-energized by the mobile robot, the permanent magnet of the second magnetic circuit is operable to anchor the state-variable anchor of the payload to a second opposing ferromagnetic surface, and
   wherein, when the electromagnet of the second magnetic circuit is energized by the mobile robot, the electromagnet of the second magnetic circuit is operable to counteract the permanent magnet of the second magnetic circuit so as to release the state-variable anchor of the payload from the second opposing ferromagnetic surface.

2. The method as in claim 1, further comprising:
   retrieving the payload from the mounting location by:
   energizing the state-variable anchor of the mobile robot to put the state-variable anchor of the mobile robot into a released state;
   contacting the state-variable anchor of the mobile robot to the payload attached to the mounting location while the state-variable anchor of the mobile robot is energized and in the released state;
   de-energizing the state-variable anchor of the mobile robot while contacting the state-variable anchor of the mobile robot to the payload attached to the mounting location to put the state-variable anchor of the mobile robot into an anchored state to attach the payload to the state-variable anchor of the mobile robot; and energizing, by the mobile robot, the state-variable anchor of the payload to put the state-variable anchor of the payload into a released state while at the mounting location and to detach the payload from the mounting location while the payload is still attached to the state-variable anchor of the mobile robot.

3. The method as in claim 1, further comprising:

selecting a particular payload from a plurality of options based on the particular payload having a particular state-variable anchor suited for the mounting location.

4. The method as in claim 1, further comprising:

preparing the mounting location for receiving the state-variable anchor of the payload prior to contacting the state-variable anchor of the payload to the mounting location.

5. The method as in claim 1, further comprising:

applying force by the mobile robot on the payload toward the mounting location while contacting the state-variable anchor of the payload to the mounting location while the state-variable anchor of the payload is energized and in the released state and while de-energizing the state-variable anchor of the payload while contacting the state-variable anchor of the payload to the mounting location.

6. The method as in claim 1, further comprising:

monitoring feedback from one or more anchor state sensors for at least one of the state-variable anchors during one or both of the energizing and de-energizing; and determining energy flow for the at least one of the state-variable anchors according to the feedback.

* * * * *